United States Patent [19]

Brooke

[11] Patent Number: 5,253,049

[45] Date of Patent: Oct. 12, 1993

[54] TUNNEL VISION VIDEO DISPLAY SYSTEM

[75] Inventor: Kenneth R. Brooke, Arlington, Tex.

[73] Assignee: Hughes Training, Inc., Arlington, Tex.

[21] Appl. No.: 840,222

[22] Filed: Feb. 24, 1992

[51] Int. Cl.$^5$ ............................................. H04N 5/74
[52] U.S. Cl. ..................................................... 358/87
[58] Field of Search .................... 358/86, 93, 104, 231, 358/160, 87; 434/62-79

[56] References Cited

U.S. PATENT DOCUMENTS

| | | | |
|---|---|---|---|
| 3,371,432 | 10/1966 | Lamb | 358/87 |
| 3,749,810 | 7/1973 | Dow | 84/1.24 |
| 3,862,358 | 1/1975 | Wolff | 358/104 |
| 4,986,187 | 1/1991 | Booth et al. | 434/63 |
| 5,015,189 | 6/1991 | Wenzinger, Jr. | 358/87 |
| 5,130,794 | 7/1992 | Ritchey | 358/84 |

Primary Examiner—James J. Groody
Assistant Examiner—Glenton B. Burgess
Attorney, Agent, or Firm—W. K. Denson-Low

[57] ABSTRACT

A video display system provides low cost, rapid processing for a high volume of participants through an interactive video system. The system includes a darkened serpentine tunnel constructed of flat faceted rear projection screens, formed as series of multi-screen sections. Video imagery is projected onto the screens from video projectors using reflecting mirrors on the back sides of the screens. The screens are mated together to form the complete tunnel. Participants travel through the darkened tunnel riding in guided vehicles. As each vehicle progresses through the tunnel, the projection screens currently surrounding the vehicle are illuminated, together with the preceding and succeeding screen sections. As the vehicle transitions from the current section to the forward section, the rearward section is extinguished and the next forward section illuminated. The image intensity of the forward section is gradually increased as the vehicle approaches, by virtue of the gain characteristics of the projection screen, thus making the transition nearly undetectable.

5 Claims, 2 Drawing Sheets

TUNNEL VISION VIDEO DISPLAY SYSTEM

BACKGROUND

The present invention relates generally to entertainment and training systems, and more particularly, to a video display system that may be employed in a moving vehicle entertainment or training system.

There are several examples of group interactive video entertainment systems that are in various stages of research, development, and test marketing. Hughes Training Inc. has a system known as "Mirage" that is a typical embodiment of a group interactive video entertainment system. The Mirage system utilizes batch processing of small groups of game players, and requires that a queue of players advance in relatively widely-spaced discrete steps. The waiting time between advances in the queue is perceived as a prime irritation factor by the public, in that there is no progress for long periods of time.

Accordingly, it would be an improvement in the art to have a video display system that may be employed in a moving vehicle entertainment system that increases the processing speed of participants through the system, thus eliminating the waiting time problem present in existing systems.

SUMMARY OF THE INVENTION

In order to achieve the above improvement, the present invention provides for a video display system that enables the operation of a group interactive entertainment system known as "Tunnel Vision Adventure", that is generally described in copending U.S. patent application Ser. No. 07/765,847 filed Sep. 23, 1991, and assigned to the assignee of the present invention. The video display system of the present invention provides a low cost means by which a high volume of participants may be processed through an interactive video entertainment system in an rapid manner. The display medium is comprised of walls of a serpentine darkened tunnel constructed of flat faceted rear projection screens, upon which video imagery is projected from video projectors disposed outside the tunnel behind the rear projection screens. Participants traverse through the darkened display tunnel riding in-vehicles that are guided and driven in a manner analogous to automobiles processed through a car wash or factory assembly line.

The video display system of the present invention provides the means by which an operator of an amusement park ride or training system may quickly and efficiently process a large number of participants. The video display system enables the use of efficient video rear projection technology in a demanding consumer environment that exhibits aspects of both a production line and an auditorium.

The video display system of the present invention allows an entertainment or training system designer to break up the participant batch size into much smaller groups, thus minimizing intergroup waiting time, and removing some of the frustration due to waiting for those participants in the queue. The system throughput is sufficiently high as to be perceived as continuous by participants. The video display system of the present invention permits the highest participant throughput of any known interactive and/or reconfigurable video presentation system.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
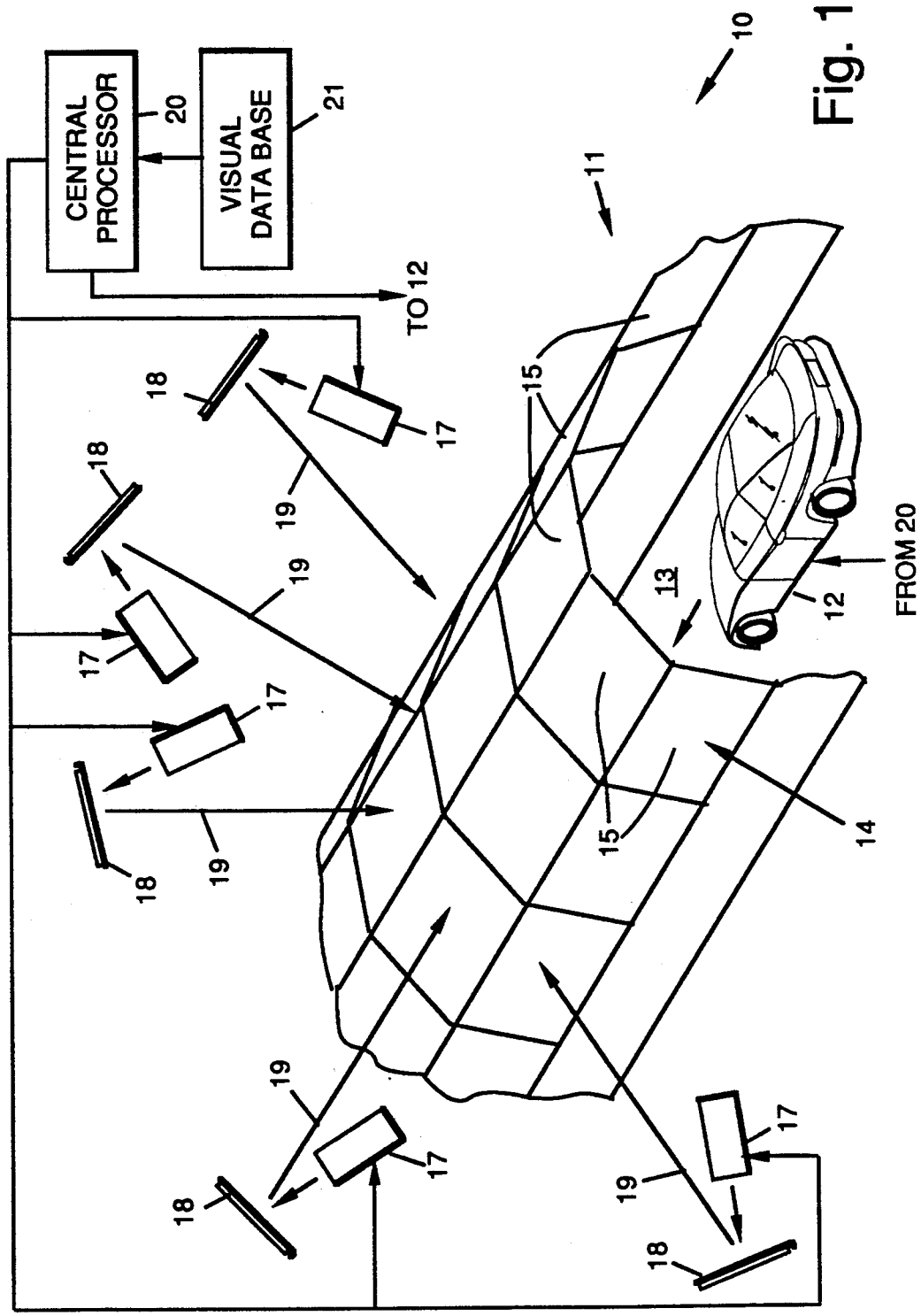
FIG. 1 shows a perspective view of a tunnel vision video display system in accordance with the principles of the present invention.

Referring to the drawing figures, FIG. 1 shows a perspective view of a video display system 10 in accordance with the principles of the present invention. The video display system 10 is shown in the context of a moving vehicle entertainment system 11 that comprises a plurality of moving vehicles 12 that are propelled along a track, for example, inside a darkened tunnel 13. The vehicles 12 in FIG. 1 are shown as automobiles for the purposes of illustration, and it is to be understood that other vehicle shapes, including spaceships, boats, airplanes or moving platforms are also appropriate for use in the present system 10. Each of the vehicles 12 has audio reproduction system therein along with appropriate instruments that enable the participants to interact with a video image and respond to audio cues provided thereto. Such instruments are specifically designed for a system 11, for example, and may comprise steering yokes or joysticks, and surrogate weapons, such as cannons, ray guns and pistols, for example. The details of these instruments may be better understood from a reading of the above-cited Tunnel Vision Adventure patent application. It is also to be understood that the present system 10 may also be employed in training systems, for example, that require the processing of relatively large numbers of participants.

The darkened tunnel 13 is formed from a plurality of faceted sections 14 that each comprise a plurality of trapezoidal and rectangular flat rear projection screens 15 and that are formed in the shape of the tunnel 13. Three sections 14 of the tunnel 13 are shown in FIG. 1, wherein each section 14 is fabricated from five individual flat rear projection screens 15. The five-screen sections 14 are then replicated along the length of the tunnel 13 to form the complete tunnel 13. The tunnel 13 may be configured as a serpentine tunnel 13 as will be described in detail below. A plurality of video projectors 17 and mirrors 18 are provided that cooperate to focus video images 19 provided by the projectors 17 onto the rear of each of the projection screens 15. The video images 19 projected by the video projectors 17 are controlled by a computer processor 20 having a visual database 21 that includes computer graphics, and the like. The computer processor 20 is coupled to each of the projectors 17 and is adapted to control the audio and video images 19 viewed by participants moving in the vehicles 12 that are propelled through the tunnel 13. It is to be understood that interconnection paths shown between the central processor 20 and the projectors 21 and vehicles 12 are shown for illustration only, and are not to be considered as limiting.

More specifically, the video display system 10 comprises a flat faceted tunnel 15 incorporated five rear projection screens 15 or panels 15 per section 14. The basic rear projection facet (screen 15) and video projector arrangement are disclosed in a patent application entitled "Rear Projection Faceted Dome", U.S. patent application Ser. No. 07/704,571, filed May 13, 1991, that is assigned to the present invention. The facets or screens 15 of the present system 10 are arranged in the shape of a serpentine tunnel 16. The vehicles 12 that seat participants are propelled down the center of the tunnel 16, and a design eyepoint (in lateral cross section), that corresponds to the position at which a participant's eye level is located, is designed to be at an eye level for seated occupants in the vehicles 12. The moving design eyepoint is designed to be approximately at a longitudinal center of the vehicle 12 at eye level.

Moving imagery without moving parts is provided by the system 10 of the present invention. One unique aspect of video display system 10 is that it contains no moving parts, in that the projectors 17, mirrors 18, and projection screens 14 are stationary. Notwithstanding the absence of moving parts, however, the occupants of each vehicle 12 are presented with video images 19 unique to that vehicle 12. Moreover, the imagery "moves" in synchronization with the vehicle 12 as it traverses the tunnel 15, allowing the designer of the entertainment system 11 to take advantage of the entire length of the tunnel 15. The image content, however, is dynamic, and is synchronized by means of the computer processor 20 to correspond with the movement of the vehicles 12. The motion effects and image content are controlled by the computer processor 20. The present system 10 has the ability to provide the illusion that a vehicle 12 is standing still, when the image content is synchronized with the forward motion of the vehicle 12. Similarly, any visual aspect of motion may also be presented to the occupants of the vehicle 12 by utilizing a mathematical manipulation of image perspective. In essence, a vector representing actual vehicle motion is uniformly applied to the overall image, but in projection screen space. Simulated motion is applied to the image content, but in database space, where changes in perspective and occlusion may be processed correctly. Such mathematical manipulation is achieved in the computer processor 20 in a straightforward manner known to those skilled in the art of real-time computer graphics processing.

Synchronization to special effects is also achieved by the video display system 10, including motion cuing. While a vehicle 12 progresses along the tunnel 13 in real world terms, it experiences simulated motion effects that cover six degrees of motion. Hydraulic actuators are employed in the vehicles 12 that provide actual motion cues in synchronization with visual motion cues provided by the images 19. The hydraulic actuators are controlled in a conventional manner by the computer processor 20. By applying means and methods developed for flight simulation motion base simulators and pneumatic technologies employed in "low rider" automobiles that are quite prevalent in Southern California, the sensation of nearly unlimited translational and rotational movement may be effected in a straightforward manner in the system 10. Sound cuing is also provided in the video display system 10. Cues may be provided by headphones worn by the participants, or by the speakers provided in the vehicles 12. A sound or audio reproduction system is located in each of the vehicles 12, or may be located adjacent the central processor 20. It is used to direct attention and augment visual cues appearing in images 19 appearing on the walls (screens 15) of the tunnel 13. Directionality is achieved through the utilization of multichannel sound rendition that correlates to events appearing in the imagery. This is also controlled in a conventional manner by the computer processor 20.

Separation of imagery between vehicles is also provided by the video display system 10. The video display system 10 takes advantage of the inherent limitations of the rear projection screen 15 for off-axis viewing. The gain characteristics of each rear projection screen 15 is selected to cause the image to dim to less than 50 percent of its center brightness when viewed from more than 60° off axis. Each facet or screen 15 is approximately eight feet tall and twenty feet long, yielding a field of view of approximately 37°×80° for a vehicle 12 positioned directly opposite it. As the vehicle 12 progresses down the tunnel 13, the five facets 15 comprising the section 14 immediately surrounding the vehicle 12 are illuminated, together with the preceding and succeeding facet sections 14. As the vehicle 12 transitions from the center to the forward section 14, the rearward section 14 is extinguished and the forward section 14 in line is illuminated. The forward section 14 intensity is gradually increased as the vehicle 12 approaches, making the transition nearly undetectable. Since the attention of the participants in the vehicle 12 is focussed in a forward direction, the extinguishing of the rear section 14 is more abrupt. The convincing illusion presented to the occupants of the vehicle 12 is that of horizon-to-horizon imagery surrounding the vehicle 12, with a dark hole ahead of and behind the vehicle 12. The intervehicular spacing is such that the imagery presented to one vehicle 12 is not viewable from another vehicle 12, theoretically enabling vehicle spacing as close as twenty-five feet.

Figure 2:
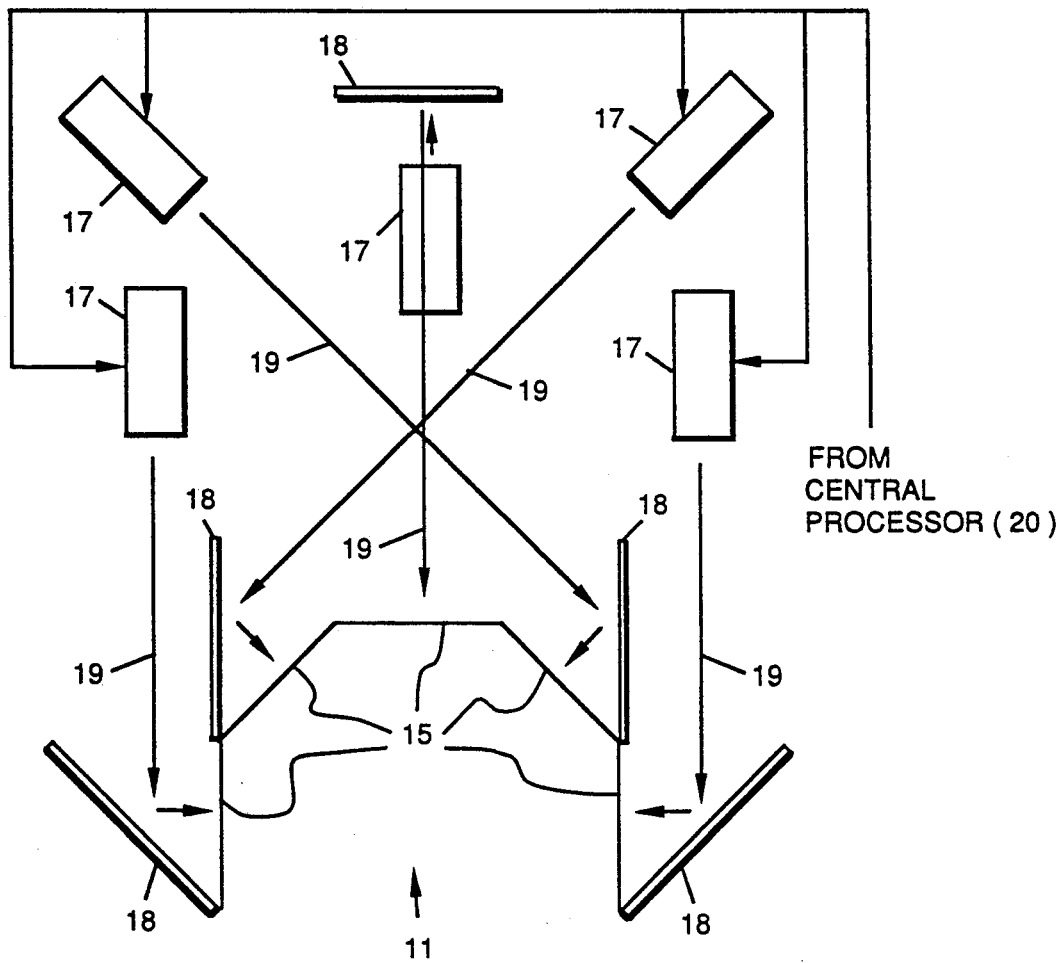
FIG. 2 shows a diagram illustrating the details of the video display system of FIG. 1.

FIG. 2 shows a diagram illustrating the details of the video display system 10 of FIG. 1. Equipment configuration considerations for the video display system 10 are as follows. For each section 14, comprising five facets or screens 15 each, five rear projection screens 15 and five projectors 17 are required. This is shown in detail in FIG. 2. It is to be understood that a wide variety of projector and mirror positioning geometries are possible with the present system 10, and the specific locations and orientations shown in FIG. 2 are for the purposes of illustration only, and are not to be considered as limiting. The resolution achieved by a system 10 with 512 lines×1024 pixel rasters on the rear projection screens 15 is between twelve and fifteen arc minutes per line pair, which is comparable to conventional training and entertainment systems. Standard 1024×1024 image generation channels are split between two rear projection screens 15, yielding a utilization of 2.5 image generation channels per rear projection screen 15.

The layout of the tunnel 15 is achieved as as follows. Turns of up to 30° may be made between sections 14 along any of the five section joints. At a turn, the sections 14 become trapezoidal, and shorter than their standard length. This allows for a serpentine tunnel layout to be implemented in a structure similar to a multi-story parking garage. Since real world vehicle velocity and position are subtracted from the eyepoint motion vector, great flexibility is achieved, with intertwining ascending and descending vehicle ramps allowing for a significant length of tunnel 15 to be packed into a relatively small structure.

The video display system 10 of the present invention is applicable for use in the mass entertainment market, most notably in an amusement or theme park setting. There are other applications in training and personnel processing markets, most appropriate to situations wherein large numbers of people are involved, such as in encountered in a military setting.

Thus there has been described a new and improved video display system that may be employed in a moving vehicle entertainment or training system. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A video graphics display system that may be employed in a moving vehicle entertainment system employing a plurality of vehicles that are adapted to move through the entertainment system, said video display system comprising:

a flat faceted serpentine tunnel having an interior and an exterior, and wherein the tunnel comprises a plurality of conterminous facet sections, each section comprising a plurality of flat rear projection screens;

a plurality of video projectors disposed adjacent the exterior of the plurality of projection screens of each facet section that are adapted to provide video imagery corresponding to image scenes that are viewable by participants that ride in the moving vehicles that move through the interior of the tunnel;

a plurality of reflecting mirrors disposed on the exterior of the projection screens of each section that are adapted to relay the video imagery from predetermined ones of the video projectors onto corresponding ones of the plurality of rear projection screens of each section.

2. The system of claim 1 wherein the gain characteristics of each rear projection screen is selected to cause the image to dim to less than 50 percent of its center brightness when viewed from more than 60 degrees off axis.

3. The system of claim 2 wherein a plurality of vehicles are adapted to move through the tunnel in a predetermined direction, and wherein as each vehicle progresses down the tunnel, the gain characteristics of the projection screens in the current, preceding and succeeding sections surrounding the vehicle cause them to be illuminated, and as the vehicle transitions from the current to the forward section, the rearward section is extinguished and the next forward section in line becomes illuminated, and wherein the image intensity of the forward section is gradually increased as the vehicle approaches, making the transition nearly undetectable.

4. The system of claim 1 wherein each rear projection screen has a resolution of 512 lines by 1024 pixel rasters.

5. The system of claim 1 wherein the tunnel comprises turns made between sections along any of its five section joints, and wherein at a turn, the sections become trapezoidal and shorter, thus providing for a serpentine tunnel.

* * * * *